United States Patent [19]

Bowen et al.

[11] Patent Number: 4,851,196

[45] Date of Patent: Jul. 25, 1989

[54] FLUID CATALYTIC CRACKING UNIT

[75] Inventors: Chester O. Bowen; Floyd H. Holland, both of Borger, Tex.

[73] Assignee: Phillips Petroleum Company, Bartlesville, Okla.

[21] Appl. No.: 6,141

[22] Filed: Jan. 23, 1987

[51] Int. Cl.$^4$ ............................................. B01J 8/26
[52] U.S. Cl. ................................... 422/144; 208/164; 422/145; 422/214
[58] Field of Search ............... 422/144, 145, 214, 142, 422/147; 208/153, 164, 161; 502/41

[56] References Cited

U.S. PATENT DOCUMENTS

| | | |
|---|---|---|
| 2,378,607 | 6/1945 | Watts . |
| 3,563,911 | 2/1971 | Pfeiffer et al. . |
| 4,048,057 | 9/1977 | Murphy . |
| 4,099,927 | 7/1978 | McKinney ........................ 422/144 |
| 4,310,411 | 1/1982 | Wilkening . |
| 4,331,533 | 5/1982 | Dean et al. . |
| 4,332,674 | 6/1982 | Dean et al. . |
| 4,336,160 | 6/1982 | Dean et al. . |
| 4,434,049 | 2/1984 | Dean et al. . |
| 4,562,046 | 12/1985 | Hays et al. . |
| 4,563,334 | 1/1986 | Hays et al. . |
| 4,574,044 | 3/1986 | Krug ..................................... 502/41 |
| 4,575,414 | 3/1986 | Skraba . |

OTHER PUBLICATIONS

Oil & Gas Journal, Mar. 22, 1982 pp. 92 et seq.
Modern Petroleum Technology (5th Ed.) p. 420.
Encyclopedia of Oil and Gas under "Cracking, Catalytic" pp. 14 and 17.

*Primary Examiner*—Michael S. Marcus
*Attorney, Agent, or Firm*—Laney, Dougherty, Hessin & Beavers

[57] ABSTRACT

A fluid catalytic cracking unit of the type having a reactor vessel positioned directly over a regenerator vessel. A pair of catalyst wells are mounted on the lower interior portion of the regenerator vessel and are each in communication with an associated conduit. The other end of each conduit is connected to an atomizing lift pot positioned beneath the lowest level of the regenerator vessel. The atomizing lift pot is placed in fluid communication with the reactor vessel via a riser reactor which may be either internal or external to the regenerator vessel. Plug valves or slide valves may be used to control the flow of regenerated catalyst from the regenerator to the lift pot.

9 Claims, 3 Drawing Sheets

FLUID CATALYTIC CRACKING UNIT

BACKGROUND AND SUMMARY OF THE INVENTION

The instant invention pertains to apparatus for fluid catalytic cracking of hydrocarbons and more particularly to such apparatus in which a catalyst reactor vessel is positioned directly over a catalyst regenerator vessel.

In fluid catalytic cracking units, it is known that atomization of an oil feedstock stream as it is injected into the riser reactor for mixing with catalyst therein enhances cracking and thereby increases conversions. This is so because increased atomization increases the surface area of the oil and thereby increases heat transfer to the oil. Such heat transfer first vaporizes and thereafter cracks the oil. Atomization is desirable when converting low boiling point oils since more efficient vaporization and cracking would permit a shorter riser reactor and/or better conversions and/or a reduction in the severity of operating conditions of the fluid catalytic cracking unit.

Atomization of the oil as it enters the riser reactor in a fluid catalytic cracking unit is particularly important when converting heavy oils which have high boiling temperatures, generally in the range of 600° F. to 1200° F. Heavy oils are especially difficult to crack to valuable products because their high boiling point and viscosity make satisfactory vaporization very difficult.

Heavy oils can be successfully cracked into desirable products where they have been vaporized prior to contact with the catalyst. With conventional feeds, vaporization is achieved by radiant energy transfer from the hot cracking catalyst to the feed droplets. This type of vaporization mechanism is satisfactory for oils boiling below thermal cracking temperatures which commence at about 850° F. For heavy oils however vaporization of large droplets by heat transfer is not completed prior to the onset of thermal cracking and coke formation. Coke laydown is worsened where liquid oil strikes the hot catalyst particles.

There is a prior art catalytic cracking unit, which includes an apparatus for atomizing oil as it is injected into the riser reactor of a fluid catalytic cracking unit having a catalyst regenerator vessel located adjacent a catalyst reactor vessel. It would be desirable to provide for atomization of oil entering a riser reactor in a fluid catalytic cracking unit having stacked vessels, i.e., a catalyst reactor vessel positioned directly over a catalyst regenerator vessel, such as the type manufactured by the M. W. Kellog Co. and sold under the Orthoflow name.

The prior art cracking unit atomizer comprises a lift pot having a nozzle cartridge assembly positioned therein located at the lower end of the riser reactor. A pipe provides fluid communication between the lift pot and the catalyst regenerator vessel. Oil feedstock is provided to the cartridge assembly which atomizes the same and mixes the catalyst therewith at the lower end of the riser reactor. It would be desirable to provide an additional conduit between the catalyst regenerator vessel and the lift pot to increase control of the catalyst flow thereto.

In one aspect, the invention comprises a fluid catalytic cracking unit having a catalyst reactor vessel positioned directly over a catalyst regenerator vessel. Spent catalyst is communicated from the reactor vessel to the regenerator vessel through a standpipe which connects the two. A mixing chamber for mixing catalyst and oil feedstock is positioned beneath the lowermost level of the catalyst regenerator vessel. The mixing chamber and the lower portion of the regenerator vessel are in fluid communication via a conduit which connect the two. Means are provided for injecting an oil feedstock into the mixing chamber which has one end of a riser reactor in fluid communication therewith. The other end of the riser reactor communicates with the reactor vessel. The invention may be embodied in fluid catalytic cracking units having both external and internal riser reactors.

In another aspect of the invention, a second conduit is provided between the mixing chamber and the lower portion of the regenerator vessel and means are provided for independently regulating the flow of catalyst in each of the conduits which connect the regenerator vessel with the mixing chamber.

DETAILED DESCRIPTION OF THE PREFERRED EMBODIMENTS OF THE INVENTION

Figures 1, 2:
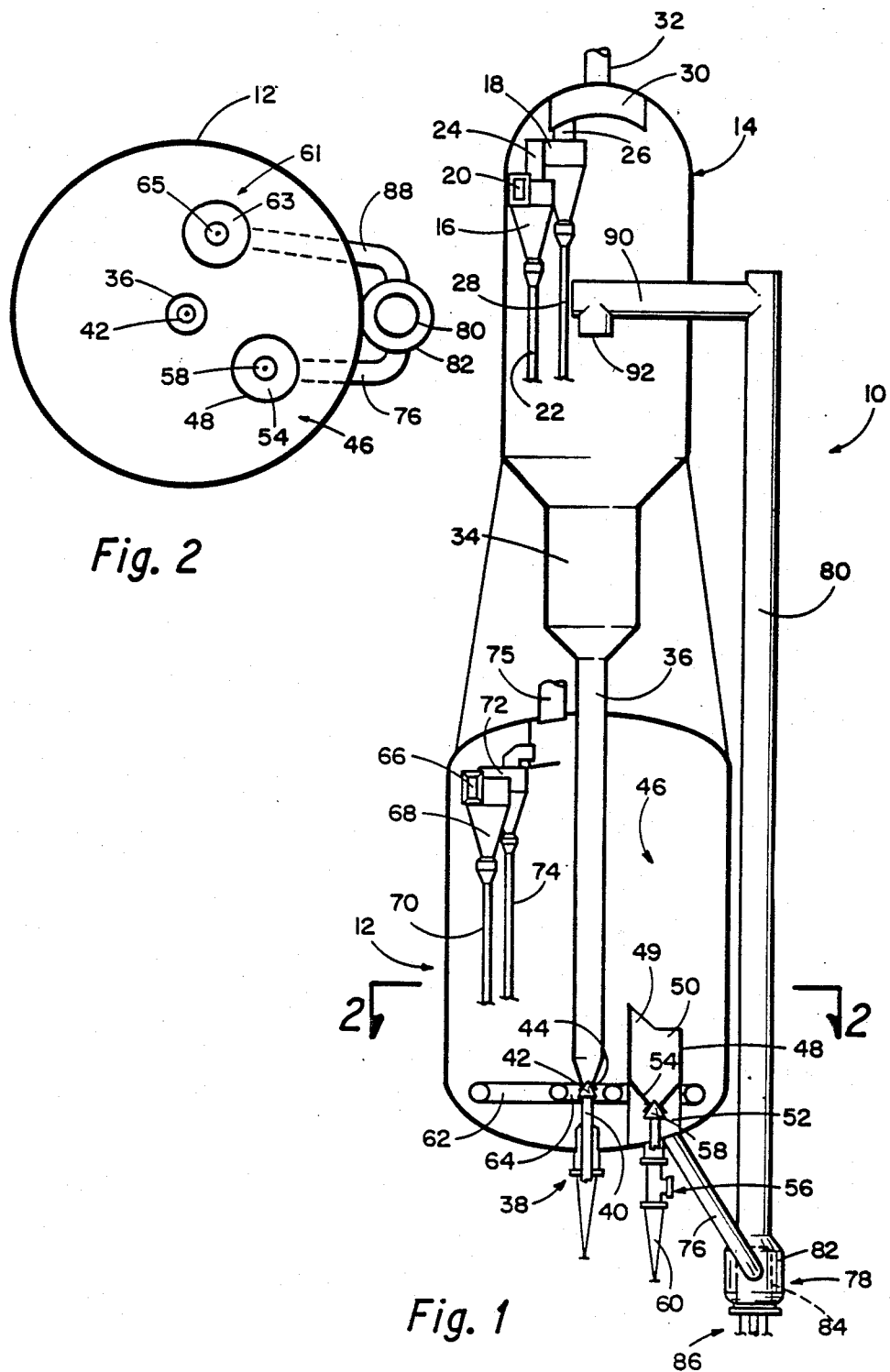
FIG. 1 is a somewhat schematic illustration of a fluid catalytic cracking unit constructed in accordance with the instant invention.
FIG. 2 is a cross-section taken along lines 2—2 in FIG. 1.

Turning now to FIGS. 1 and 2, indicated generally at 10 is a fluid catalytic cracking unit constructed in accordance with the instant invention. Included therein is a catalyst regenerator vessel 12 for regenerating spent catalyst and a catalyst reactor vessel 14. The reactor vessel includes therein a primary cyclone 16 and a secondary cyclone 18. The primary cyclone includes an inlet 20 and a dipleg 22 for return of solids to reactor vessel 14. A duct 24 provides communication between the primary cyclone and secondary cyclone 18 which includes a flue gas outlet 26 and a dipleg 28 for return of additional recovered solids to reactor vessel 14. Flue gas outlet 26 is in communication with a plenum chamber 30. A conduit 32 leads from chamber 30 to a conventional separating tank (not shown) and associated equipment (also not shown) for separating the recovered hydrocarbons emitted from reactor vessel 14 via conduit 32. It should be noted that the primary and secondary cyclones are conventional in their structure and operation.

A stripping section or zone 34 is provided for stripping entrained hydrocarbons from the spent catalyst under action of gas, usually steam, introduced into the reactor vessel in zone 34. After being stripped in zone 34, the cracking catalyst is conveyed from zone 34 to catalyst regenerator 12 through a standpipe 36. Flow from stand pipe 36 into catalyst regenerator 12 is controlled by a conventional plug valve 38. The plug valve includes a body 40 having a conical head 42 mounted on the upper end thereof. In operation, body 40 is moved downwardly to permit flow from the lower end of the standpipe into catalyst regenerator vessel 12 and is moved upwardly against a frusto-conical seat 44 formed on the lower end of standpipe 36 thereby sealing the lower end of the standpipe and preventing catalyst flow therefrom.

Indicated generally at 46 is a catalyst well. The catalyst well comprises a cylindrical container 48 mounted on a lower interior portion of regenerator vessel 12. Container 48 includes a raised portion 49 which defines a high side of the container that is directed toward standpipe 36. The catalyst well includes an upper portion 50 and a lower portion 52 which are separated from one another by a substantially conical hopper 54. A plug valve 56 includes a conical head 58 which is received against an opening in the center of hopper 54 to seal the upper portion from the lower portion. Head 58 is mounted on a valve body 60 which, when moved downwardly, permits flow of catalyst from the upper portion to the lower portion of the catalyst well.

A pair of concentric hot air rings 62, 64 are mounted on a lower interior portion of vessel 12 concentric with standpipe 36. The rings include a plurality of openings spaced thereabout to permit heated air to circulate through the spent catalyst in the lower portion of the regenerator vessel for burning the coke therefrom.

A second catalyst well 61, which is substantially identical to catalyst well 46, is viewable in FIG. 2 but it is omitted from the view of FIG. 1 for the sake of clarity. Catalyst well 61 is received between rings 62, 64 as is catalyst well 46, and includes therein a hopper 63, like hopper 54 in catalyst well 46, and a plug valve separating the catalyst well into upper and lower portions, such having a conical head 65 viewable in FIG. 2.

Gasses generated by coke burning in regenerator vessel 12 are received in an inlet 66 of a primary cyclone 68 with solids being returned to the regenerator vessel via dipleg 70. A secondary cyclone 72 removes additional entrained solids which are returned to the regenerator vessel via dipleg 74 with flue gasses being vented through flue 75. Cyclones 68, 72 are conventional in structure and operation.

A conduit 76 has one end connected to the lower portion of regenerator vessel 12 beneath catalyst well 46 and is thus in fluid communication with lower portion 52 of the catalyst well. The other end of conduit 76 is in fluid communication with a mixing chamber or lift pot 78 which is mounted on the lower end of a riser reactor 80. Lift pot 78 comprises a substantially upright cylindrical portion 82 having a substantially cylindrical nozzle cartridge assembly 84 received therein. Lines 86 are connected to a source of oil feedstock (not shown) which is atomized by nozzles (also not shown) in cartridge assembly 84 with the atomized oil feedstock being emitted from the cartridge assembly into the lower end of riser 80. As will later be described in more detail, catalyst is provided to the annulus between cartridge assembly 84 and the radially inner surface of cylindrical portion 82. A source of gas (not shown) urges catalyst in the annulus upwardly to mix with the vaporized oil feedstock in the lower end of the riser. Lift pot 78 and nozzle cartridge assembly 84 are conventional and are described in greater detail in U.S. Pat. No. 4,562,046 to Hayes et al., which is incorporated herein by reference.

A second conduit 88, such being visible in FIG. 2, connects the lower portion of catalyst well 61 with lift pot 78. The riser reactor includes a lateral portion 90 and an opening 92 for emitting cracked hydrocarbons and spent catalyst into reactor vessel 14.

The embodiment disclosed in FIG. 1 is a modification of a conventional stacked fluid catalytic cracking unit. The particular embodiment of FIG. 1 is a modification of such a unit manufactured by the M. W. Kellog Co. which is sold under the Orthoflow name. In its original condition, the cracking unit includes a third catalyst well between rings 62, 64, such being substantially equally distant from wells 46, 61. The third catalyst well is substantially identical to each of the other two catalyst wells. Each of the three catalyst wells has received in the upper portion thereof the lower end of a riser reactor which extends upwardly in regenerator vessel 12, through the upper portion thereof and into reactor vessel 14. Each of the plug valves in the catalyst wells is of the type having a hollow body through which hydrocarbon feedstock is discharged into the lower end of each riser. The modification is accomplished by removing all three internal riser reactors, installing the external riser reactor as shown in FIG. 1 and removing one of the three catalyst wells. Additionally, the plug valves for catalyst wells 46, 61 have the hollow portion thereof blocked since hydrocarbon feedstock is not discharged through the plug valves of the embodiment shown in the invention.

In operation, regenerated catalyst flows, under action of hot air from rings 62, 64, upwardly into upper portion 50 of catalyst well 46 and into the upper portion of catalyst well 61. Raised portion 49 on catalyst well 46 assures that spent catalyst will be exposed to hot air for at least so long as it takes catalyst emitted from the lower end of stand pipe 36 to travel upwardly therefrom over the upper end of container 48. The plug valves on each of the catalyst wells are used to regulate the flow of catalyst through conduits 76, 88 into lift pot 78. The catalyst flows from each conduit into opposite sides of the lift pot. Catalyst is forced upwardly under action from steam provided to the lift pot where it mixes with atomized oil feedstock supplied via lines 86 to nozzle cartridge assembly 84. The feedstock mixes with the catalyst in the lower end of riser 80 with the feedstock being vaporized and cracked as it travels upwardly in the riser. Spent catalyst and cracked hydrocarbon products are emitted from opening 92 into reactor 14. Cyclones 16, 18 remove entrained catalyst from the cracked hydrocarbon products in a conventional manner and provide the cracked products to a separating tank and associated equipment via conduit 32. Spent catalyst is stripped in zone 34 after which it falls into standpipe 36. Catalyst is admitted into regenerator vessel 12 via plug valve 38 which controls the flow of the same into the regenerator. Cyclones 68, 72 remove entrained catalyst from gasses generated by burning of coke in regenerator vessel 12 and emit the gasses through flue 75.

Figures 3, 4:
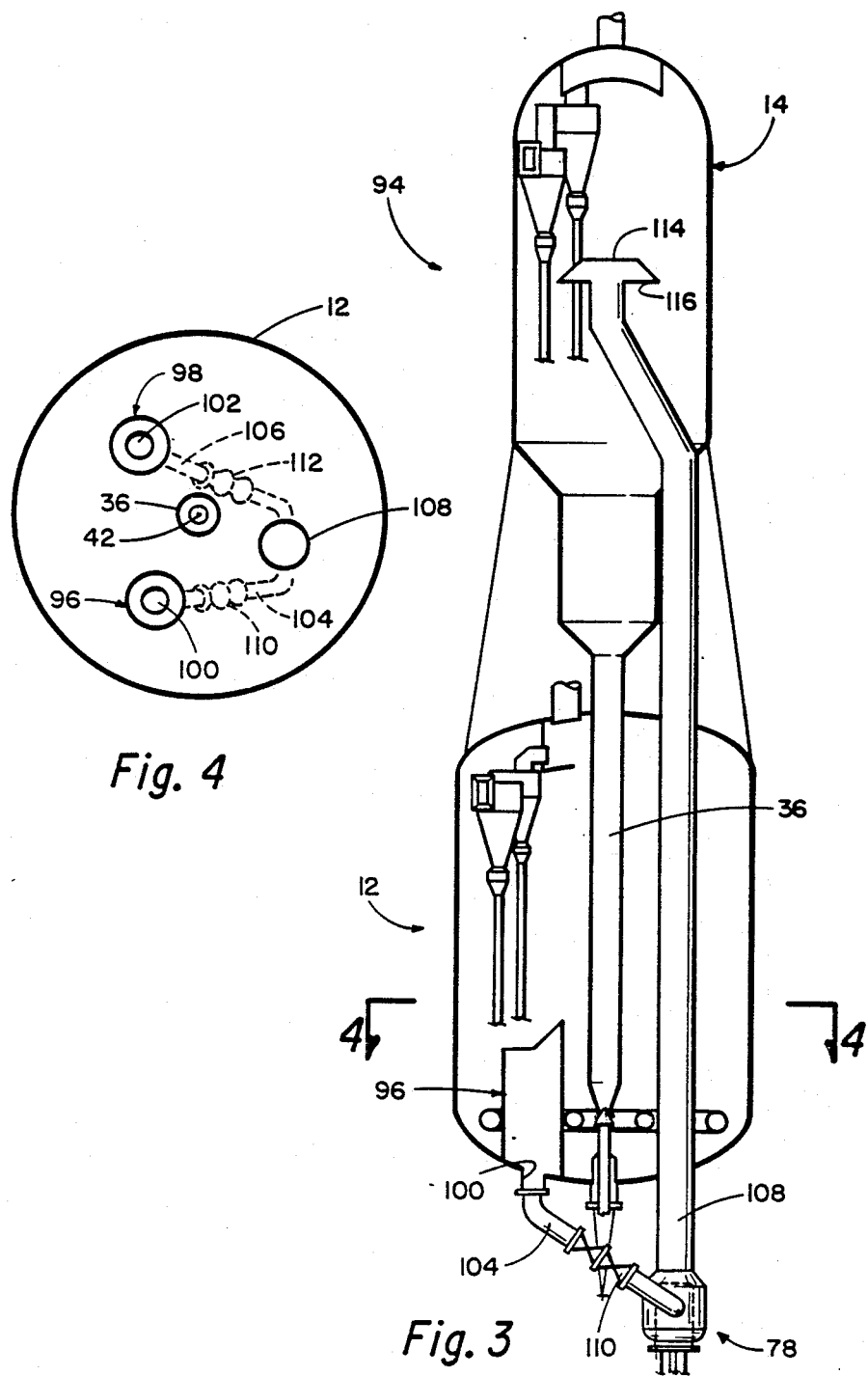
FIG. 3 is a somewhat schematic illustration of a second embodiment of a fluid catalytic cracking unit constructed in accordance with the instant invention.
FIG. 4 is a cross-section taken along lines 4—4 in FIG. 3.

Turning now to FIGS. 3 and 4, indicated generally at 94 is a second embodiment of a fluid catalytic cracking unit constructed in accordance with the instant invention. Structure which corresponds to the same structure in the previously-described embodiment of FIGS. 1 and 2 is either identified with the same numeral as in FIGS. 1 or 2 or is unnumbered. Unnumbered structure in FIGS. 3 and 4 which is substantially the same as the numbered structure in FIGS. 1 and 2 is constructed and operates in substantially the same manner as the previously-described structure.

Cracking unit 94 includes a pair of catalyst wells 96, 98, with catalyst well 98 being shown only in the view of FIG. 4 for the sake of clarity. Unlike the catalyst wells in the embodiment of FIGS. 1 and 2, catalyst wells 96, 98 do not includes therein plug valves which divide the same into upper and lower portions but rather comprise an upright substantially cylindrical container mounted on a lower interior portion of regenerator vessel 12. An opening 100, 102 is formed in regenerator vessel 12 inside each catalyst well. Each of the openings communicate with an associated conduit 104, 106 with the other end of each conduit being in communication with lift pot 78 which is mounted on the lower end of a riser 108.

Each of conduits 104, 106 includes therein a pair of conventional slide valves 110, 112, respectively. Each slide valve includes a pair of opposing substantially planar gates which are slidable radially inwardly and outwardly relative to the axis of the conduit. When the gates are abutting one another, flow through the conduit is prevented. As the gates are withdrawn from one another flow increases with the gate positions determining the amount of catalyst flow through the conduit.

Riser 108 includes a deflector 114 mounted on the upper end thereof having an annular downwardly-directed opening 116 formed therein.

The operation of the embodiment of FIGS. 3 and 4 is similar to that of the embodiment of FIGS. 1 and 2. A significant difference between the two is that the catalyst wells are not divided into upper and lower portions by plug valves. Flow of regenerated catalyst from vessel 12 into lift pot 78 is controlled by slide valves 110, 112. In addition, riser reactor 108 is internal to vessel 12. In modifying the original stacked vessel fluid catalytic cracking unit to form the embodiment of FIGS. 3 and 4, two of the riser reactors are removed as are the plug valves in the catalyst wells associated with the removed risers. The catalyst well into which the third riser is received is removed and the riser is extended downwardly beneath regenerator vessel 12. Lift pot 78 is mounted on the lower end of the riser and conduits connecting the lift pot with each of the catalyst wells, including slide valves in the conduits, are provided as shown in FIGS. 3 and 4. The upper end of the riser is moved inwardly to be substantially coaxial with vessel 14 and deflector 114 is added.

Figures 5, 6:
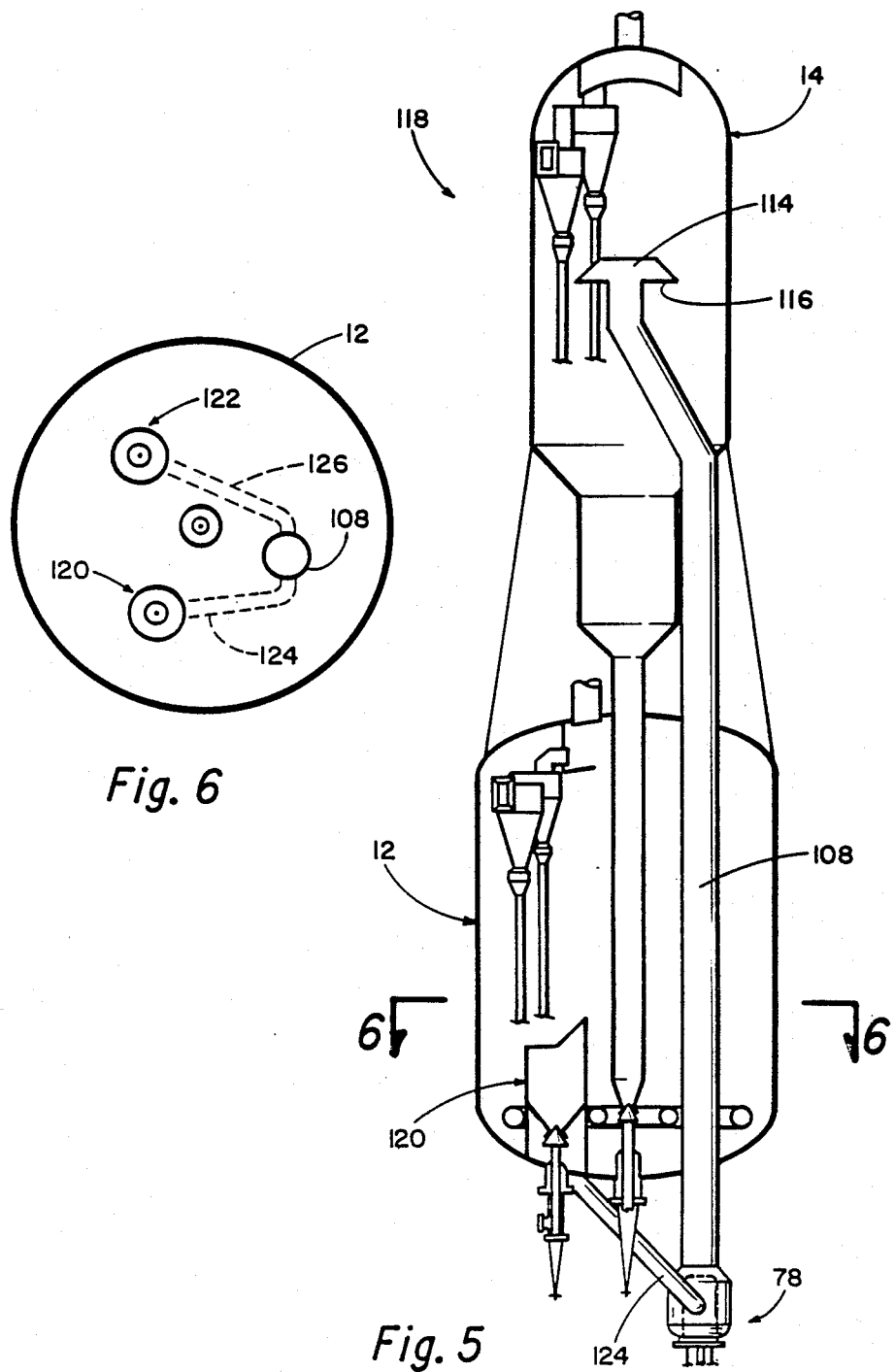
FIG. 5 is a somewhat schematic illustration of a third embodiment of a fluid catalytic cracking unit constructed in accordance with the instant invention.
FIG. 6 is a view taken along lines 6—6 in FIG. 5.

Turning now to FIGS. 5 and 6 and considering a third embodiment of the invention, indicated generally at 118 is a fluid catalytic cracking unit constructed in accordance with the instant invention. Structure which is substantially identical to structure appearing in the previously described embodiments is either unnumbered or retains the same number as shown in FIGS. 1–4. Like the embodiment of FIGS. 1 and 2, fluid catalytic cracking unit 118 in FIGS. 5 and 6 includes a pair of catalyst wells 120, 122 which are substantially identical to the catalyst wells described in FIG. 1 with each catalyst well including a plug valve. The lower portion of each catalyst well is connected via a conduit 124, 126 as shown to opposing sides of lift pot 78.

The operation of the embodiment of FIGS. 5 and 6 is substantially the same as the embodiment of FIGS. 3 and 4 except that catalyst flow from regenerator vessel 12 to lift pot 78 is controlled by plug valves in catalyst wells 120, 122 rather than by the slide valves shown in FIGS. 3 and 4.

It is to be appreciated that additions and modifications may be made to the embodiments of the invention disclosed herein without departing from the spirit of the invention which is defined in the following claims.

I claim:

1. A fluid catalytic cracking unit comprising:
 a catalyst regenerator vessel;
 a catalyst reactor vessel positioned directly over said catalyst regenerator vessel;
 means for communicating spent catalyst from said reactor vessel to said regenerator vessel;
 a mixing chamber for mixing catalyst and oil feedstock, said mixing chamber being positioned beneath the lowermost level of said catalyst regenerator vessel;
 a first conduit disposed between said mixing chamber and a lower portion of said regenerator vessel;
 means for regulating flow of catalyst in said conduit from said regenerator vessel to said mixing chamber;
 means for injecting an oil feedstock into said mixing chamber;
 a riser reactor having a first end in fluid communication with said mixing chamber and a second end in fluid communication with said reactor vessel;
 a first catalyst well mounted on a lower interior portion of said regenerator vessel and wherein one end of said conduit is in fluid communication with said first catalyst well;
 a second catalyst well mounted on a lower interior portion of said catalyst regenerator vessel; and
 a second conduit disposed between said second catalyst well and said mixing chamber.

2. The fluid catalytic cracking unit of claim 1 wherein said mixing chamber comprises an upright cylindrical portion and wherein said conduits are connected thereto directly across from one another.

3. The fluid catalytic cracking unit of claim 1 wherein said mixing chamber includes means for atomizing said oil feedstock.

4. A fluid catalytic cracking unit comprising:
 a catalyst regenerator vessel;
 a catalyst reactor vessel positioned directly over said catalyst regenerator vessel;
 means for communicating spent catalyst from said reactor vessel to said regenerator vessel;
 a mixing chamber for mixing catalyst and oil feedstock, said mixing chamber being positioned directly beneath said catalyst regenerator vessel;
 a conduit disposed between said mixing chamber and a lower portion of said regenerator vessel;
 means for regulating flow of catalyst in said conduit from said regenerator vessel to said mixing chamber;
 means for injecting an oil feedstock into said mixing chamber;
 a riser reactor received within said catalyst regenerator vessel and having a first end which extends downwardly beneath said catalyst regenerator vessel, said first end being in fluid communication with said mixing chamber, said riser reactor further having a second end which extends upwardly above said catalyst regenerator vessel, said second end being in fluid communication with said reactor vessel;
 a first catalyst well mounted on a lower interior portion of said regenerator vessel and wherein one end of said conduit is in fluid communication with said first catalyst well;

a second catalyst well mounted on a lower interior portion of said catalyst regenerator vessel, said second catalyst well having an open upper portion for receiving catalyst therein from said regenerator; and a conduit disposed between said second catalyst well and said mixing chamber.

5. An improved fluid catalytic cracking unit of the type having a catalyst reactor vessel positioned directly over a catalyst regenerator vessel, a central standpipe for communicating spent catalyst from said reactor vessel to said regenerator vessel, and first and second catalyst wells mounted on a lower interior portion of said catalyst regenerator vessel, wherein the improvement comprises:

a riser reactor having a lower end which extends downwardly beneath the lowermost level of said regenerator vessel and an upper end in communication with said reactor vessel, said riser reactor being spaced apart from said central standpipe;

means for injecting an oil feedstock into the lowermost end of said riser reactor;

a first conduit having an upper end in fluid communication with said first catalyst well and a lower end in fluid communication with the lowermost end of said riser reactor;

means for regulating the flow of catalyst in said first conduit; and a second conduit having an upper end in fluid communication with said second catalyst well and a lower end in fluid communication with the lowermost end of said riser reactor.

6. The improved fluid catalytic cracking unit of claim 5 wherein said improvement further comprises means for regulating the flow of catalyst in said second conduit.

7. The improved fluid catalytic cracking unit of claim 5 wherein said improvement further comprises a mixing chamber mounted on the lowermost end of said riser reactor and Wherein said conduits are in fluid communication with said mixing chamber.

8. The improved fluid catalytic cracking unit of claim 7 wherein said mixing chamber further includes means for atomizing such a an oil feedstock.

9. The improved fluid catalytic cracking unit of claim 7 wherein said mixing chamber comprises an upright cylindrical wall having a pair of opposing bores formed therethrough, each of said conduits being in fluid communication with a different one of said bores.

* * * * *

UNITED STATES PATENT AND TRADEMARK OFFICE
CERTIFICATE OF CORRECTION

PATENT NO. : 4,851,196
DATED : July 25, 1989
INVENTOR(S) : Chester O. Bowen; Floyd H. Holland It is certified that error appears in the above-identified patent and that said Letters Patent is hereby corrected as shown below:

Column 8, line 16, change "Wherein" to --wherein--.

Column 8, line 20, delete "a".

Signed and Sealed this

Fifteenth Day of May, 1990

Attest:

HARRY F. MANBECK, JR.

*Attesting Officer*  *Commissioner of Patents and Trademarks*